Feb. 17, 1931.  F. M. VAN DEVENTER  1,792,945
VALVE
Filed Nov. 18, 1926
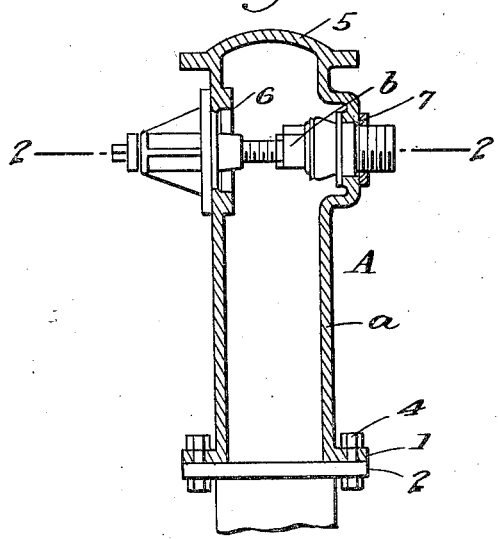
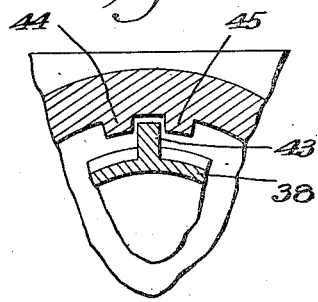
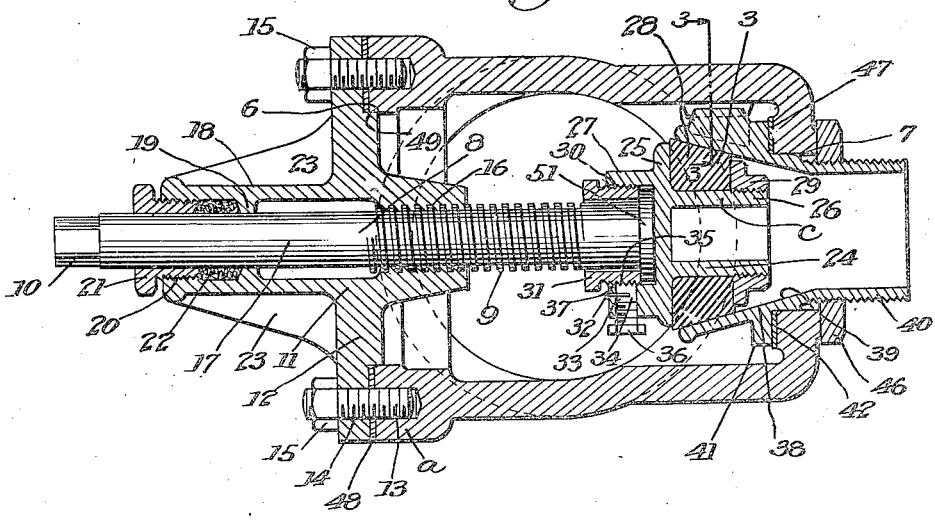
INVENTOR:
Francis M. Van Deventer
BY
Blakeslee & Brown
ATTORNEYS.

Patented Feb. 17, 1931

1,792,945

UNITED STATES PATENT OFFICE

FRANCIS M. VAN DEVENTER, OF LOS ANGELES, CALIFORNIA

VALVE

Application filed November 18, 1926. Serial No. 149,081.

This invention relates to improvements in valves particularly adapted for use in fire hydrants. At the present time the average fire hydrant is subjected to all forms of collisions which break the fire hydrant housing or breaks off the valve stem, necessitating repairs. These repairs must be made in a shop and cannot conveniently be made at the zone of the fire hydrant, as the valve parts must be in perfect alignment.

The present invention has for an object the provision of an improved valve for fire hydrants which may be readily repaired on the street and at the location of said hydrant.
Another object is the provision of a fire hydrant which is so constructed as to overcome the necessity of using machines to align the valve parts thereof.

Another object is the provision of a valve for fire hydrants wherein repairs may be made by one workman, and with minimum expense and time.

Another object is the provision of a construction wherein all the parts are readily accessible and it is not necessary to attempt to get within the fire hydrant housing to make adjustments.

Other objects will appear as the specification proceeds, which objects include simplicity of operating parts, general durability and serviceability, and inexpensiveness of manufacture.

With the above and other objects in view the invention consists in the novel and useful provision, formation, construction, association and relative arrangement of parts, members and features, all as shown in certain embodiments in the accompanying drawing, described generally and more particularly pointed out in claims.

In the drawing:

Figure 1 is a longitudinal vertical section of a fire hydrant incorporating the invention;

Figure 2 is a cross sectional view on the line 2—2 of Figure 1; and

Figure 3 is a cross sectional view on the line 3—3 of Figure 2.

Corresponding parts in all the figures are designated by the same reference characters.

Referring with particularity to the drawing, the improved fire hydrant is designated as an entirety by A, and in which $a$ is the stand or barrel and $b$ a valve in said stand, both of which elements are used in practicing one embdiment of the invention. The stand $a$ is conventional in form, being provided with a base flange 1 secured to a flange 2 of the conduit 3 by bolting or otherwise, as shown at 4. The base is usuallly at ground level. The said stand or barrel is provided with a top 5 and formed below said stop and transversely in said stand is a pair of aligned openings 6 and 7.

The valve $b$ is adapted to be secured to said stand and to in part project through said openings. It will be noted upon reference to Figure 2 that the stand or barrel is not annular shaped at the zone of said openings 6 and 7 but that said stand assumes an elongated appearance.

The valve $b$ includes a stem 8 formed with screw threads 9 and with a squared end 10. This stem is secured in part within a guide housing or box 11, which box is formed with a flange 12 whereby the same may be secured to the stand $a$. The securing means may consist in the present instance, of studs 13 projecting outwardly from the stand and through openings 14 formed in the said flange 12 with nuts carried by said studs whereby the flange 12 is tightly secured to the stand. Furthermore, the box is formed with an internal screw-threaded part 16 to accommodate the screw-threaded portion 9 of the stem 8, while that portion of the stem which is not screw-threaded shown at 17 is passed within the extended portion 18 of the box, the box to this end being provided with an internal guide flange 19. The portion 18 is internally screw-threaded at 20 and accommodates a gland nut 21. Packing 22 is adapted to surround the portion 17 of the stem and be interposed between the nut 21 and the flange 19. I have thus provided a stuffing box portion for the stem. To give strength to the extension 18 and to in a measure assure that this portion of the device should not be easily broken, I provide webs 23 between the extension and the flange 12. The opposite end of said stem 17 carries a valve designated generally as c. This valve includes a body member 24. The body has a disc portion 25 having an annular flange 26 extending from one surface thereof, and an enlargement 27 extending from the opposite surface thereof. Carried on the annular flange 26 and bearing against the disc 25 is a valve disc 28, which is locked in place by a nut 29 screw-threaded to the member 26. The enlargement 27 is bored and screw-threaded as shown at 30, and the stem 8 carries a thimble 31 which is screw-threaded at 32 for engagement with the screw-threads 30. The enlargement 27 is formed with a transverse bore 33 and a plug 34 formed with a threaded end 35 is adapted to engage the screw threads of the thimble 31, and a lock bolt 36 is screw-threaded within the bore 33 and bears against the plug 34. After the threads of the plug tightly engage the threads of the thimble 31 and a pin 37 is passed within aligned openings in both the plug and the enlargement 27 to further assure that the plug does not disengage the threads of the thimble 31. The valve seat member 38 is tapered as shown at 39 to accommodate the disc 28 which has a tapered seat. This valve seat is formed with an external threaded extension or nipple 40 which projects through the opening 7 and beyond the stand a, and said valve seat is likewise provided with an annular flange 41 adapted to bear against the wall 42 of the stand. The valve seat member is provided with a key or flange 43 adapted to be received between two inwardly projecting flanges 44 and 45 associated with the stand. A nut 46 is adapted for screw-threaded engagement with the threads 40 and bears against the outer surface of the stand adjacent the opening 7.

Briefly stating the operation, as well as the manner of assembling the valve, will say that the present method, or at best the method most generally used for fire hydrants, contemplates the use of a valve which must be placed within the stand and secured in position by lead or babbitt. Thus, if the valve is damaged in any manner, such as by some vehicle colliding with the hydrant, it is necessary that the stand be unbolted from the flange 2 and taken to a work shop where the valve may be correctly aligned within the transverse openings of the stand, and held so aligned while the Babbitt metal is being poured around the valve.

In order to make adjustments in this type of hydrant it is necessary that the top of the hydrant be removable so that access to the interior may be had. With my invention, however, the top is cast integral with the stand, as it is unnecessary to get inside of the stand to make any adjustments whatsoever. If the hydrant valve is damaged in the least, it is only the work of a few moments to remove the old valve and insert a new one. All work on my hydrant is preferably machined so that the various parts will align perfectly and fit tightly together.

Assume that the hydrant has been damaged by a truck striking the same and breaking the valve stem. After shutting off the water main to the hydrant, the nut 46 is removed, after which the nuts 15 are unscrewed from the studs 13 and the entire valve removed through the opening 6 of the stand. A gasket 48 is placed on the stand a adjacent the opening 6, said gasket being held so positioned by the studs 13. A new valve b carrying a gasket 47 is then inserted through the openings 6 and 7. The gasket 47 will be positioned between the flange 41 and the wall 42. The studs 13 will pass through the openings 14 of the flange 12 so that the inner surface of said flange will bear against the gasket 48, and in this particular it will be noted that the flange 12 is shouldered at 49 so as to fit within a portion of the opening 6. The flange 43 of the valve seat member would be so positioned as to be received between the flanges 44 and 45, and the nut 46 would be screw-threaded thereon to secure the valve seat member in place. The nuts 15 would then be secured on the studs and tightened against the flange 12. It will thus be seen that no particular alignment of the present device is necessary and that one man can place a new valve within the stand in a few moments. It will further be seen that such a replacement can be made on the street. The method of securing the stem 8 and the stem nut to the part c of the valve, has been previously detailed and will not be repeated here. The screw-threaded part 40 is the part that usually receives the cap and is likewise the part with which the fire hose is connected.

It will be particularly noted that the parts as so assembled will not permit unscrewing of the valve disc member from its stem, nor will a turning of the stem in any way affect the valve seat member. The valve seat member will be maintained in position to the stand and held against turning by the part 43 being between the members 44 and 45. The stem thimble is carried upon the stem 8 and bears against the flanged end 51 thereof, and after this thimble is secured to the screw threads 30 and then locked thereto by the plug 34, it is evident that this thimble cannot turn relative to the body member 24. I have thus provided two novel means for locking the valve parts in position to their respective members.

It is obvious that various changes and modifications may be made in practicing the invention, in departure from the particular showing of the drawing, without departing from the true spirit of the invention.

Having thus disclosed my invention, I claim and desire to secure by Letters Patent:

1. A valve having an internally threaded stem end receiving bore, a portion of the threaded area of which is constituted by a member movable radially into and out of said bore, means to hold said member against rotation, a stem end disposed within said bore, a thimble threaded into said bore retaining said stem end therein, and means for exerting and maintaining inward pressure through said member against said thimble to lock the latter against rotation relative to said valve.

2. A valve having an internally threaded stem end receiving formation, a stem provided with an annular flange disposed within said formation, an externally threaded thimble surrounding said stem and threaded into said formation for cooperation with said flange to provide a swivel connection between said valve and said stem, said stem receiving formation having a laterally extending opening formed therein, a plug slidable in said opening provided with thread formations at its inner end for interfitting engagement with the threads of said thimble, means for forcing said plug inwardly against said thimble thereby to lock said thimble against rotation with respect to said valve, and means independent of said last named means for retaining said plug within said opening and for holding same against rotation.

3. A valve having an internally threaded stem end receiving bore, a portion of the threaded area of which is constituted by a member movable radially into and out of said bore, a stem end disposed within said bore, a thimble threaded into said bore retaining said stem end therein, means for exerting and maintaining inward pressure through said member against said thimble to lock the latter against rotation relative to said valve, and means independent of said last named means for retaining said member in assembly with said valve and for holding same against rotation.

4. A valve having an internally threaded stem end receiving formation, a stem provided with an annular flange disposed within said formation, an externally threaded thimble surrounding said stem and threaded into said formation for cooperation with said flange to provide a swivel connection between said valve and said stem, said stem receiving formation having a laterally extending opening formed therein, a plug slidable in said opening provided with thread formations at its inner end for interfitting engagement with the threads of said thimble, a pin extending through a portion of said formation into said plug to retain the latter in assembly with the valve and to hold same against rotation, and means for forcing said plug inwardly against said thimble thereby to lock said thimble against rotation with respect to said valve.

In testimony whereof, I have signed my name to this specification.

FRANCIS M. VAN DEVENTER.